US008626984B2

(12) United States Patent
Pack

(10) Patent No.: US 8,626,984 B2
(45) Date of Patent: Jan. 7, 2014

(54) METHOD AND SYSTEM FOR DEVICE INDEPENDENCE IN STORAGE DEVICE WEAR ALGORITHMS

(75) Inventor: Gordon F. Pack, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 484 days.

(21) Appl. No.: 12/257,546

(22) Filed: Oct. 24, 2008

(65) Prior Publication Data

US 2010/0106888 A1   Apr. 29, 2010

(51) Int. Cl.
*G06F 12/08* (2006.01)

(52) U.S. Cl.
USPC ............... 711/103; 711/101; 710/62

(58) Field of Classification Search
None
See application file for complete search history.

(56) References Cited

U.S. PATENT DOCUMENTS

2008/0189485 A1*  8/2008  Jung et al. ............ 711/115
2009/0300238 A1* 12/2009  Panabaker et al. ......... 710/62

* cited by examiner

*Primary Examiner* — Alan Otto
(74) *Attorney, Agent, or Firm* — Campbell Stephenson LLP

(57) ABSTRACT

A device, methods and systems that provide device independence in storage device wear algorithms are disclosed. A storage device that provides such device independence includes a device-specific wear algorithm, and may also include an integrated wear algorithm. The device-specific wear algorithm is configured to be loaded into a wear algorithm space and is at least a portion of a wear algorithm. The device-specific wear algorithm is stored in the storage device. The integrated wear algorithm, if employed, is resident in the storage device. A method that provides such device independence is also disclosed. The method includes loading a device-specific wear algorithm from a storage device into a wear algorithm space. The device-specific wear algorithm is configured to be stored in the storage device and loaded into the wear algorithm space. The device-specific wear algorithm is at least a portion of a wear algorithm.

28 Claims, 7 Drawing Sheets

METHOD AND SYSTEM FOR DEVICE INDEPENDENCE IN STORAGE DEVICE WEAR ALGORITHMS

BACKGROUND OF THE INVENTION

1. Field of the Invention

This invention relates to the field of storage devices, and more particularly to device independence in wear algorithms for storage devices.

2. Background

As electronic devices have continued to shrink in size, such devices have become increasingly popular, and so, ubiquitous. The desire for smaller devices has necessitated smaller storage devices. Smaller storage devices have a tendency to use their storage media more intensively, from a physical perspective. Intensive use of only a portion of the storage device's storage media can cause premature failure in certain storage devices. One solution is to more evenly distribute accesses to the storage device through the use of wear-leveling algorithms.

For example, such wear-leveling algorithms are important in the operation of semiconductor memories. One example of a memory type that benefits from the use of wear-leveling algorithms is a type of Electrically Erasable Programmable Read-Only Memory (EEPROM) known as flash memory. Flash memory can be used, for example, in memory cards and Universal Serial Bus (USB) storage devices, for the general storage and transfer of data between computers and other digital products.

Endurance is one of the key aspects of flash memory technology, describing the number of program and erase cycles that can be performed on a given physical block of the flash memory before that physical block wears out. The goal of wear-leveling algorithms is to evenly spread the program and erase cycles among the available blocks in the flash memory's memory array. Such wear leveling avoids a worn-out block compromising the reliability of the entire storage device. By spreading out the locations at which the program and erase cycles occur, such failures can be minimized. This is of importance, for example, in applications that treat such storage devices as fixed-media devices (e.g., the use of flash memory as a hard-disk drive). Such applications will typically attempt to localize read and write operations with the intention of improving a hard-disk drive's performance and efficiency, while reducing the physical stress experienced by the hard-disk drive. In a flash memory device, however, this has the opposite effect on reliability, while offering no particular benefits with regard to efficiency.

Wear-leveling algorithms thus seek to prevent the early deterioration of flash memory blocks hosting dynamic data due to the high cell stress induced by the frequent program and erase cycles that would otherwise be performed repeatedly on such blocks. This can be achieved, for example, by maintaining a block mapping table in the flash memory controller's memory. The block mapping table, implementing the wear-leveling algorithm employed, dynamically binds the block logical address to an alternative physical address. Of necessity, the wear-leveling algorithm (or more simply, the wear algorithm) is generic in nature, as a given flash memory device may be used in any one of a number of applications. Moreover, the wear algorithm used in a given device is designed to provide only a certain level of reliability (and thus, a given wear algorithm may not achieve the highest possible reliability for the given device, particularly when used in a specific application).

As a result, the wear algorithm provided in a given flash memory is likely to be less than optimal than for one or more specific applications accessing the storage device. However, it will be appreciated that neither the manufacturer's creation nor their implementation of multiple wear algorithms for a given storage device is practical (or even possible) alternative, given the wide array of uses to which such a storage device might be put. There is no way for the manufacturer to determine the manner in which a given storage device will be used, nor is it possible for the manufacturer to determine the optimal wear algorithm for each such use.

Equally difficult is the position of the original equipment manufacturer (OEM). Having multiple sources of storage devices for a given piece of equipment being manufactured, the OEM must provide some large number of device drivers, if the optimal lifetime is to be coaxed from the storage device actually installed in the equipment. This situation leads to bloating of the operating system's software. Moreover, the use of a new storage device and/or application will likely entail the addition of yet more device drivers, in order to maintain the storage device's lifetime. The need for device driver installation is particularly untenable in an end-user environment, and may well be either impractical or impossible in such circumstances. This situation leaves the OEM in a predicament—make no changes to the storage device and its use, or change the operating system software as needed. A solution to the dilemma presented by the desire for optimal storage device lifetime with flexibility in the use and replacement of such storage devices is therefore desirable.

BRIEF DESCRIPTION OF THE DRAWINGS

Embodiments of the present invention may be better understood, and numerous objects, features, and advantages made apparent to those skilled in the art by referencing the accompanying drawings.

The use of the same reference symbols in different drawings indicates similar or identical items.

DESCRIPTION OF EXAMPLE EMBODIMENTS

Figure 1:
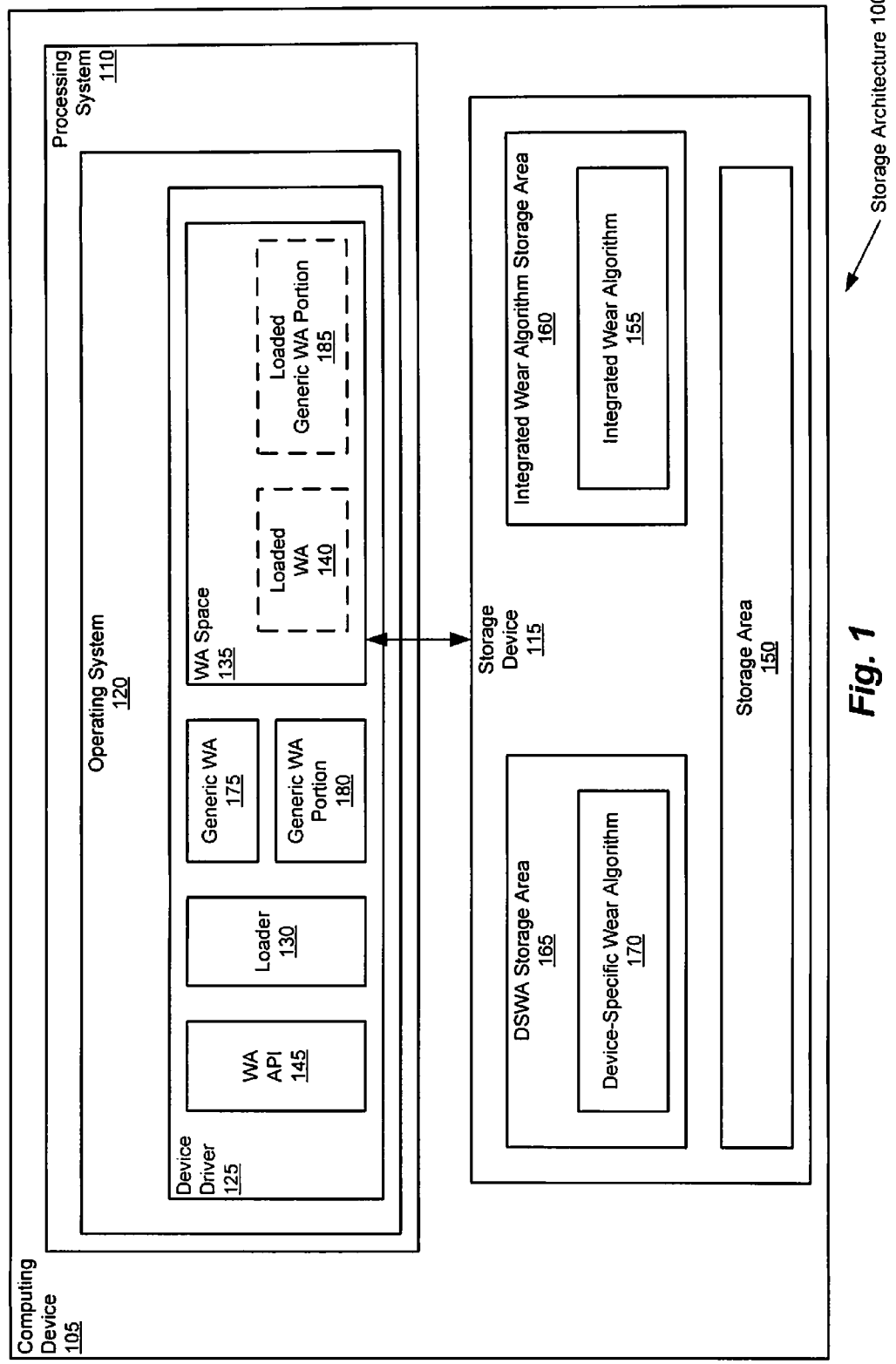
FIG. 1 is a block diagram illustrating an example of a storage architecture according to embodiments of the present invention.

The following is intended to provide a detailed description of an example of the invention and should not be taken to be limiting of the invention itself. Rather, any number of variations may fall within the scope of the invention which is defined in the claims following the description.

Introduction

Embodiments of the present invention provide a method and system that provide an operating system with access to a given storage device, while improving the storage device's wear characteristics beyond that typically provided by integrated wear algorithms. Embodiments of the present invention provide this and other advantages by employing a device-specific wear algorithm (or portion thereof, such as one or more sub-algorithms, parameter sets or the like) stored in the storage device. Such a device-specific wear algorithm can be stored, for example, in either a dedicated storage area, or in the storage device's main storage area. The device-specific wear algorithm is then loaded into the operating system, device driver or the like. The loaded device-specific wear algorithm can then be used to access the device. The storage of a device-specific wear algorithm (DSWA) in the given storage device allows an operating system (typically a device driver thereof) to maintain code that is generic to the storage device, while being able to access the storage device in a manner that provides an improved lifespan, as compared to simply performing such accesses using the integrated wear algorithm resident in the storage device.

Embodiments of the present invention provide several advantages. One advantage is device-independence. Embodiments of the present invention provide wear algorithms optimized for a given storage device (and even application), while simplifying the operating system and obviating the need for operating system/device driver upgrades to support different storage devices. Wear performance is improved even in systems supporting a variety of applications, high-availability systems, and the like. Moreover, storage devices having a wide range of reliability can be used, by allowing the designer (or system) to employ a variety of wear algorithms, in order to tailor the wear algorithm employed to the application at hand. Further, if a generic portion of a wear algorithm is maintained in a device driver, for example, only device-specific portion (sub-algorithm(s), parameter(s) or the like) need be maintained in the storage device. In one scenario, a number of storage devices can be supported using the same generic wear algorithm, but different parameters. In this case, the requisite parameters are retrieved from the storage device in use, and the loaded wear algorithm employed to good effect in accessing the given storage device.

It will also be appreciated, in light of the present disclosure, that not only the lifespan, but also the performance of a storage device can be improved by changing the manner in which the storage device is accessed. For example, an improved sector selection algorithm can improve wear algorithm performance. Using embodiments of the present invention, such alternate algorithms can be incorporated in device drivers or other software modules loaded from the storage device. Such algorithms enable the operating system and other software in the computer system to remain unchanged, and so, storage device independent. As will be appreciated from the discussions that follow, the present invention is not restricted to wear algorithms. Software components, whether or not stored in the storage device, can be employed to enhance and/or change other storage device characteristics, once loaded. These and other advantages will be apparent from the following examples.

An Example Storage Architecture

FIG. 1 is a block diagram illustrating an example of a storage architecture 100 according to embodiments of the present invention. As depicted in FIG. 1, storage architecture 100 includes a computing device 105. Computing device 105, in turn, includes a processing system 110 and a storage device 115. Processing system 110 is configured to execute an operating system 120. Operating system 120 accesses storage device 115 via a device driver 125. Device driver 125 is configured to load a wear algorithm (WA) using a loader 130 that loads the wear algorithm into a wear algorithm space 135. The wear algorithm thus loaded appears in FIG. 1 as a loaded wear algorithm 140. As will be appreciated in light of the present disclosure, the information loaded into wear algorithm space 135 as loaded wear algorithm 140 need not be a complete wear algorithm. Loaded wear algorithm 140 can be a portion of a wear algorithm or simply one or more of the parameters used in a wear algorithm, for example. Among other elements, operating system 120 is able to access loaded wear algorithm 140 via a wear algorithm application programming interface (API) 145.

Storage device 115 includes a storage area 150 that is made available to operating system 120 via device driver 125, for purposes of storing and retrieving information for use by operating system 120. Typically, a storage device such as storage device 115 will include a wear algorithm provided by the manufacturer of storage device 150. Such a wear algorithm is depicted in FIG. 1 as an integrated wear algorithm 155. Integrated wear algorithm 155 is stored in storage device 115 in an integrated wear algorithm storage area 160. As will appreciated, in light of the present disclosure, integrated wear algorithm storage area 160 can in fact be subsumed in storage area 150. Integrated wear algorithm 155 is resident in storage device 115, and so is configured to operate from within storage device 115.

Integrated wear algorithm 155 can, for example, reduce or partially offset the effects of multiple program and erase cycles on a given block (or sector) by counting the number of program and erase cycles, and dynamically remapping the block(s) (or sector(s)) in order to spread the write operations between the sectors. Another approach is to perform write verification and remapping to spare sectors in case of a write failure, a technique called bad block management (BBM). For portable consumer devices, these wear management techniques can extend the life of the flash memory beyond the life of the device itself. Moreover, a given amount of data loss may be more acceptable in certain applications, thereby making failures more tolerable. For data storage, however, such failures are typically catastrophic. Thus, simply using the storage device OEM's wear algorithm (e.g., integrated wear algorithm 155) is not advisable, particularly if the storage device will be subject to a relatively large number of program and erase cycles.

Storage device 115 also provides a storage area for a device-specific wear algorithm (depicted in FIG. 1 as a device-specific wear algorithm storage area 165). As will be appreciated, in light of the present disclosure, device-specific wear algorithm storage area 165 can subsumed in storage area 150. A device-specific wear algorithm (DSWA) 170 is stored in DSWA storage area 165. This can be, for example, a modified sector (or block) selection algorithm, or other algorithm. In fact, it will be appreciated that while integrated wear algorithm 155 is a complete wear algorithm (and so ready for use in accessing storage device 115), DSWA 170 need not necessarily be a complete wear algorithm. Although DSWA 170 can be a complete wear algorithm, DSWA 170 can also be only a portion of a wear algorithm or simply one or more of the parameters used in a wear algorithm.

As noted, the result of loading of a wear algorithm (e.g., DSWA 170 or generic WA 175) into wear algorithm space 135 is depicted as loaded wear algorithm 140. In a similar manner, a generic WA portion 180 can be loaded into wear algorithm space 135 using loader 130. This results in a loaded generic WA portion 185. The loading of generic WA portion

180 may be necessitated, for example, by DSWA 170 being something less than a complete wear algorithm (e.g., resulting from a generic WA portion being employed). This may be the case, for example, when a wear algorithm needs only parameters to provide support for the various devices to be employed. Thus, loaded wear algorithm 140 can be a portion of a wear algorithm, or one or more parameters, in which case generic WA portion 180 is needed. In the alternative, loaded wear algorithm 140 can be a complete wear algorithm, and, once loaded, obviate the need for any generic WA portion. It will also be appreciated that, in the alternative, generic WA portion 180 can be executed from its initial location.

Operating system 120 is able to access loaded wear algorithm 140 in wear algorithm space 135 via wear algorithm application programming interface (API) 145. Operating system 120 is also able to access and control loader 130 via WA API 145, in order to control the loading of one or more wear algorithms (e.g., loading a wear algorithm into wear algorithm space 135). Once the wear algorithm(s) have been loaded, operating system 120 is also able to control their operation via WA API 145.

In an example of the operation of storage architecture 100, device driver 125 loads DSWA 170 into WA space 135 (and thus, the copy of DSWA 170 loaded into WA space 135 is thus loaded WA 140). However, if storage device 115 does not contain a device-specific wear algorithm or device-specific wear algorithm 170 is corrupted, a generic wear algorithm 175 can be provided, for example, as part of device driver 125. In the situation in which DSWA 170 does not exist or cannot be loaded for some reason, generic WA 175 is loaded into WA space 135, a copy of which then exists in WA space 135 as loaded WA 140. One of skill in the art will appreciate that, in light of the present disclosure, device driver 125 can be characterized as including a generic portion of the software needed to provide wear leveling capabilities to operating system 120. This makes operating system 120 (and device driver 125) device independent, by allowing generic portions of one or more wear algorithms to be included as part of the operating system/device driver employed. By contrast, the device-dependent (device-specific) portion of the wear algorithm can be stored on the storage device and retrieved when this portion is needed. The device-dependent (device-specific) portion of the software, needed to provide wear leveling capabilities to operating system 120, is represented by DSWA 170. It will be appreciated that, as noted elsewhere, this device-specific portion can in fact be the entire wear algorithm, a portion thereof or simply one or more parameters.

In fact, as will be appreciated in light of the present disclosure, it is possible to download loaded wear algorithm 140 and/or loaded generic WA portion 180 to storage device 115 (and, more specifically, to DSWA storage area 165). For example, certain embodiments allow loaded wear algorithm 140 and loaded generic WA portion 180 to be treated as a single, complete wear algorithm. Such might be the case, for example, if loaded wear algorithm 140 included only parameters for the wear algorithm employed. In that case, loaded generic WA portion 180 would be updated with the parameters from loaded wear algorithm 140, and then downloaded to storage device 115. In operation, the wear algorithm thus stored in storage device 115 would be an updated version of loaded generic WA portion 180. Alternatively, if loaded wear algorithm 140 and loaded generic WA portion 180 we portions of a wear algorithm (e.g., the code representing one or more formulas, and the code for the remaining portion of the wear algorithm, for example), these separate portions can be merged with one another, and the resulting wear algorithm downloaded to storage device 115. It will be appreciated, however, that if DSWA storage area 165 were subsumed in storage area 150, DSWA storage area 165 could be exposed to the risk of failure comparable to that of the blocks/sectors of storage area 150.

In certain situations, applications uniformly update data in the given storage device (e.g., the storage of photographs in a digital camera, which are subsequently downloaded from the storage device and then deleted). In this case, the storage device is more evenly worn than might otherwise be the case, and the device-specific optimizations of the selected device-specific wear algorithm will take this into consideration. Non-volatile memory devices (e.g., flash memory devices) have also come into widespread use in laptop and desktop computers, for example, to the point of completely replacing hard-drives in some systems. In such systems, a variety of applications will potentially make use of such storage devices (e.g., the operating system, word-processing applications, spreadsheet applications, database applications and so on). Such applications can cause a variety of wear patterns, particularly when such storage devices are dealt with as hard-drives by operating systems. The selected device-specific wear algorithm will take this into account by more aggressively spreading out the program/erase cycles. Such effects can be even more pronounced in specific applications: dedicated systems (e.g., network devices), high-availability systems and other such applications. In such applications, the storage device's lifespan can be unexpectedly short in light of the workloads placed on the storage device. By loading a storage device with multiple device-specific wear algorithms, the storage device can provide a lifespan optimized for the given application(s).

In fact, multiple device-specific wear algorithms can be stored in the storage device, and given one of the device-specific wear algorithms loaded, based on the age of the storage device (e.g., the number of program/erase cycles to which the storage device has been subjected). In this scenario, each of the device-specific wear algorithms is optimized for a given range of program/erase cycles. As will be appreciated, in light of the present disclosure, a wide variety of effects can be taken into consideration in creating the device-specific wear algorithms, and their combination (e.g., using multiple device-specific wear algorithms) is contemplated hereby.

A device-specific wear algorithm can be fashioned in a number of ways. Wear algorithms in common use can be divided, for example, as follows. It will be apparent in light of the present disclosure that other alternatives can be devised, both for the wear algorithms discussed below, as well as other wear algorithms. In hot-cold swapping, one can load the predefined threshold that is used to determine when oldest and youngest blocks are swapped. In static-dynamic swapping, the predefined threshold used in the HC swapping can be loaded, for use in static mode, while the round-robin parameters used in the dynamic mode can also be made loadable. In a two-level replacement scheme, the predefined threshold used in the second level of replacement can be made loadable. With a replacement by formula scheme, the parameters for the given formula used, or even the entire formula can be made loadable. In a CAT approach, the parameters for the pre-tuned aging function (and/or the pre-tuned aging function itself) can be made loadable. For turn-based selection, values for the x and y parameters used in selecting a block/sector can be loaded, as can the decision to select blocks/sectors randomly or by selecting the next block/sector with all live data (or some other selection scheme). With old-block protection, the predefined threshold employed can be made loadable. These and other alternatives will be apparent, in light of the present disclosure.

More generally, the selection of the next sector to be used by the operating system can be altered, in order to more evenly distribute program/erase cycles. This holds true not just for sector selection, but also by incrementing the sector number in a write block in the device. For writes to small blocks, then, the writes are packed in one after the other, and thus do not use a larger write block for small files. Another alternative is to read wear statistics (if available) from the device, and then write to less worn areas or move blocks which are read only to high-wear areas.

Of course, it will be apparent in light of the present disclosure that a given wear algorithm can be loaded in whole or in part, along with the parameters discussed herein. Moreover, not only can the device-specific wear algorithm be loaded in toto, but may also have one of several sub-portions and/or parameter sets loaded. Further still, the wear algorithm employed can be selected from a number of such wear algorithms, and then a specific parameter set loaded for the given application. Many such permutations will be apparent in light of the present disclosure.

It will also be appreciated, in light of the present disclosure, that the storage device's integrated wear algorithm and a device-specific wear algorithm for the storage (and application(s), if such is the case) need not employ the same wear algorithm. Conversely, the device-specific wear algorithm and the integrated wear algorithm can employ the same wear algorithm, albeit with different parameters. Also, the device-specific wear algorithm will typically be designed such that the use of the storage device's integrated wear algorithm and other effects are taken into account. As noted elsewhere herein, such effects include which of the integrated wear algorithm and the device-specific wear algorithm are invoked first.

It will be noted that variable identifiers (e.g., "N") are used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified (e.g., by "N" or any other such identifier) may represent the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal may be the first signal, or a modification of the first signal, whether due to circuit limitations or due to passage through other circuit elements which do not change the informational and/or final functional aspect of the first signal.

An Example of the Operation of a Device-Specific Wear Algorithm

Figure 2:
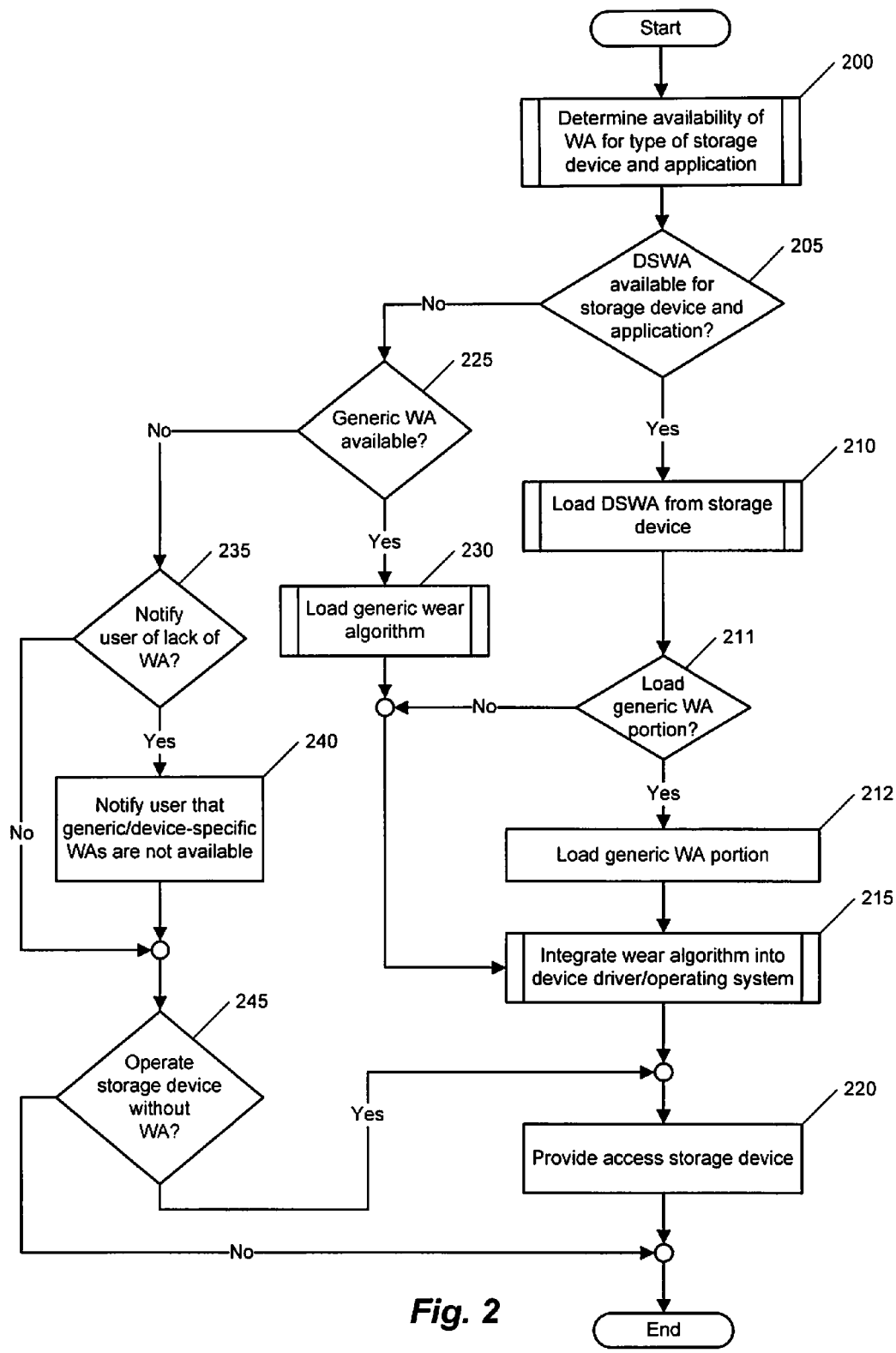
FIG. 2 is a flow diagram illustrating an example of a process for using a wear algorithm according to embodiments of the present invention.

FIG. 2 is a flow diagram illustrating an example of a process for using a wear algorithm according to embodiments of the present invention. The process begins with a determination as to the availability of a wear algorithm specific to the type of storage device in use (e.g., storage device 115) and, in some embodiments, the application(s) that will be accessing the storage device (step 200). This process is described in greater detail in connection with FIG. 3. If a device-specific wear algorithm is available for the given storage device and application (step 205), a device-specific wear algorithm (e.g., DSWA 170) is loaded by the device driver (e.g., device driver 125) from the storage device (e.g., storage device 115) into the device driver's wear algorithm space (e.g., wear algorithm space 135, such that DSWA 170 appears as loaded wear algorithm 140) (step 210). The process of loading a device-specific wear algorithm from the storage device is described in greater detail in connection with FIG. 4.

Another determination is made as to whether or not to load a generic WA portion (step 211). If a generic WA portion is to be loaded (e.g., DSWA 170 is only a portion of the given wear algorithm), a generic WA portion is loaded into the device driver's wear algorithm space (step 212). Such is the case if, for example, the generic WA portion is complete except for the parameters to be used. The DSWA loaded in such a scenario will provide the requisite parameters. Alternatively, it may be determined that a generic WA portion need not be loaded (step 211). This may be the case if, for example, the DSWA loaded is a complete algorithm. The operations performed closely parallel those of FIG. 4, save for the fact that the generic WA portion is loaded from within the device driver.

A number of permutations with thus be evident, in light of the present disclosure. Though not shown in FIG. 2, it will be appreciated that multiple DSWA's can be provided within and for a given storage device. This allows the appropriate DSWA to be selected and loaded as part of the process depicted in FIG. 2. In so doing, optimized storage device lifetime can be maintained in a multi-application environment, while supporting access to the storage device by these various applications.

Another possibility is maintaining and/or determining information regarding the state of the storage device's memory blocks/sectors (either individually or by grouping the memory blocks/sectors), and then using that information to determine which of a number of DSWA's to use. Such a determination can be based on the age of the device or memory blocks (e.g., in terms of program/erase cycles for an individual memory block/sector, a group of memory blocks/sectors, or the storage device), the difference between most- and least-worn memory blocks/sectors, the amount of data held in each such memory block/sector (or group thereof), or through the use of other such metrics. A variety of adaptive techniques can thus be implemented in embodiments of the present invention. Moreover, these and other metrics can also be used as an input to a given wear algorithm, allowing for the implementation of self-adapting wear algorithms. In light of the present disclosure, these and other alternatives will be apparent to one of skill in the art.

The wear algorithm thus loaded is then integrated into the device driver/operating system, and so made available for use by the operating system in accessing the storage device (step 230). The process of integrating the wear algorithm into the device driver/operating system is discussed in greater detail in connection with FIG. 6. If the device-specific wear algorithm is not complete, it is at this point that the device-specific wear algorithm and generic wear algorithm portion can also be integrated with one another. For example, the device-specific wear algorithm can simply provide parameter values for the generic wear algorithm portion. Integration of the device-specific wear algorithm and generic wear algorithm portion can be accomplished by inserting the parameter values into the generic wear algorithm portion, resulting in a wear algorithm that is complete. The device driver is then able to provide the operating system with access to the storage device, in a manner that provides improved lifespan as compared to such access without the use of such a wear algorithm. In accessing the storage device, then, the operating system employs the wear algorithm loaded into the wear algorithm space of the device driver (step 220).

If a device-specific wear algorithm is unavailable for some reason (step 205), a determination is made as to whether a generic wear algorithm is available (e.g., generic wear algorithm 175) (step 225). Though not shown, it will be appreciated that, in light of the present disclosure, a determination can also be made to always use a generic wear algorithm, regardless of the availability of a DSWA. If a generic wear algorithm is available (step 225), the generic wear algorithm is loaded into the wear algorithm space of the device driver (step 230). The process of loading a generic wear algorithm is described in further detail in connection with FIG. 5.

If neither a device-specific wear algorithm (step 205) nor a generic wear algorithm (step 225) are available, a determination is made as to whether the user should be notified as to the lack of a wear algorithm that can be loaded into the wear algorithm space of the device driver (step 235). If such notification is desired, the user is notified that neither a generic nor a device-specific wear algorithm is available (step 240). Though not shown, it will be appreciated that such notification can be provided as to the unavailability of the generic wear algorithm or device-specific wear algorithm, taken alone. Otherwise, no such notification is provided. If operating the storage device without either a generic wear algorithm or a device-specific wear algorithm is acceptable (step 245), access to the storage device is provided using only the integrated wear algorithm that is provided with the storage device (or without, if no such integrated wear algorithm is provided) (step 220). Otherwise, access to the storage device is not permitted. In fact, though not shown, it will also be appreciated that, in light of the present disclosure, a determination can be made not to use either a generic wear algorithm or a device specific wear algorithm, and so always rely on whatever integrated wear algorithm is stored within the storage device.

As noted, FIG. 2 depicts a flow diagram illustrating a process according to an embodiment of the present invention, as do other of the figures depicting flow diagrams that are discussed herein. It will be appreciated that operations discussed herein may consist of directly entered commands by a computer system user or by steps executed by application specific hardware modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by a computer system, for example, from computer readable media. The computer readable media may be permanently, removably or remotely coupled to the computer system. The computer readable media may non-exclusively include, for example, any number of the following: magnetic storage media including disk and tape storage media; optical storage media such as compact disk media (e.g., CD-ROM, CD-R, DVD, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. In a UNIX-based embodiment, the software modules may be embodied in a file which may be a device, a terminal, a local or remote file, a socket, a network connection, or other expedient of communication or state change. Other new and various types of computer-readable storage media may be used to store and/or convey the software modules discussed herein.

Figure 3:
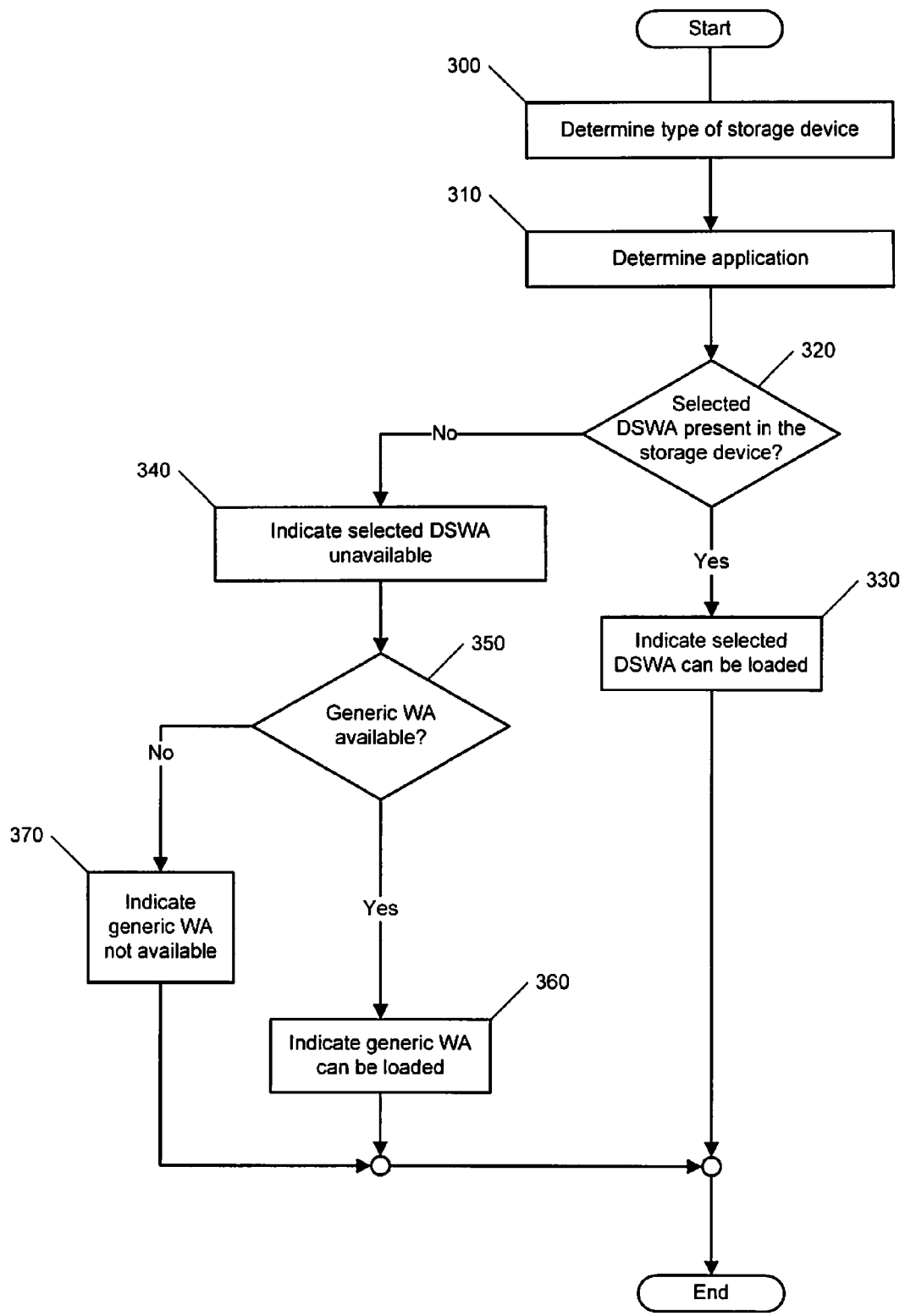
FIG. 3 is a flow diagram illustrating an example of a process for determining the availability of wear algorithm(s) according to embodiments of the present invention.

FIG. 3 is a flow diagram illustrating an example of a process for determining the availability of wear algorithm(s) according to embodiments of the present invention. The process begins with a determination as to the type of storage device being used (step 300). In some embodiments, a determination is also made as to the application(s) that will be using the storage device (step 310). In such embodiments, the selected device-specific wear algorithm will take into account the manner in which the given application is expected to use the storage device's blocks/sectors.

Next, a determination is made as to whether the selected device-specific wear algorithm is present in the storage device (step 320). If the device-specific wear algorithm is present in the storage device (step 320), an indication is made as to the availability of the selected device-specific wear algorithm for loading into the wear algorithm space of the device driver (step 330). However, if the selected device-specific wear algorithm is not present in the storage device (step 320), an indication is made as to the unavailability of the selected device-specific wear algorithm (step 340). If the selected device-specific wear algorithm is not available (step 320), a determination is made as to the availability of a generic wear algorithm (step 350). If a generic wear algorithm is available (step 350), an indication is made with regard to the availability of the generic wear algorithm for loading into the wear algorithm space of the device driver (step 360). However, if a generic wear algorithm is also unavailable (step 350), an indication is made with regard to the unavailability of the generic wear algorithm (step 370).

Figure 4:
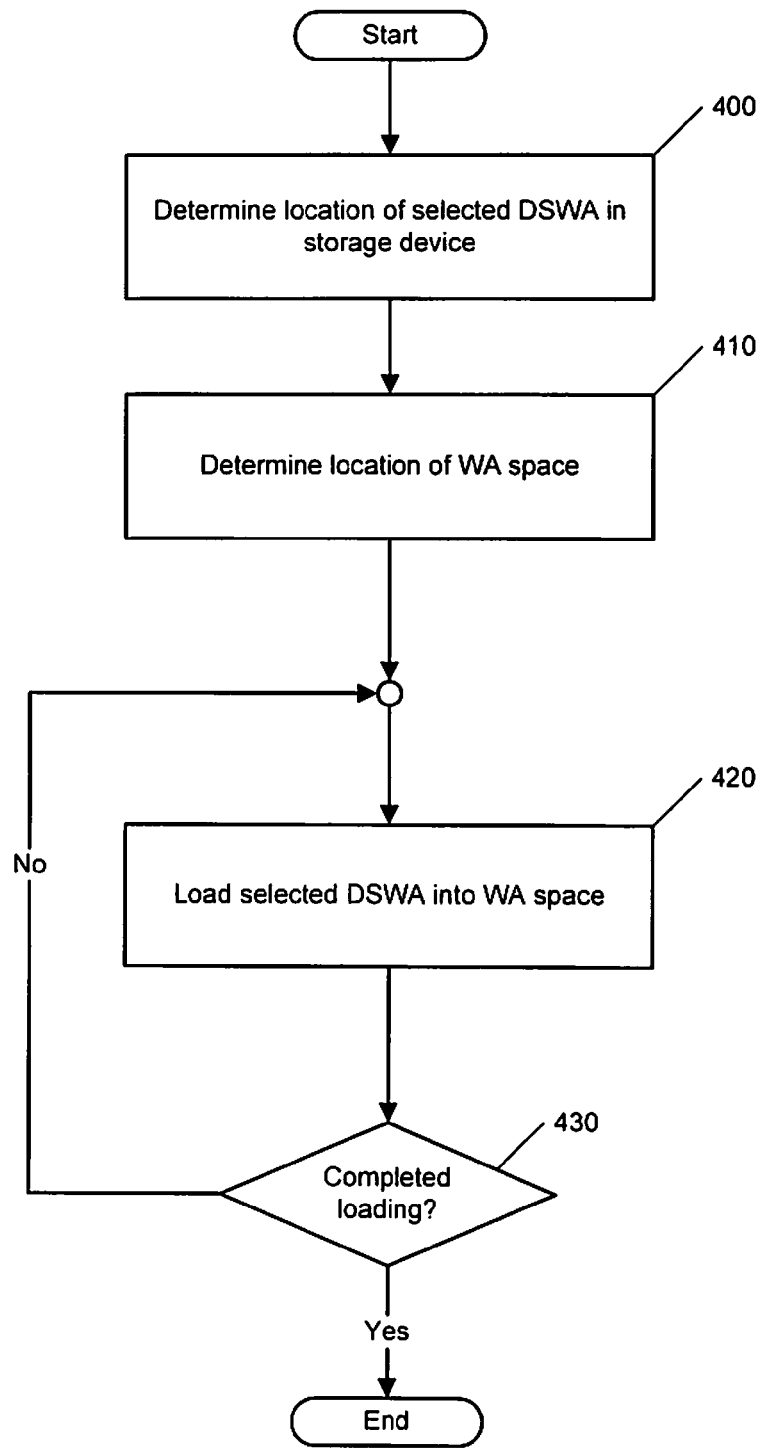
FIG. 4 is a flow diagram illustrating an example of a process for loading a device-specific wear algorithm according to embodiments of the present invention.

FIG. 4 is a flow diagram illustrating an example of a process for loading a device-specific wear algorithm according to embodiments of the present invention. The process begins, for example, with a determination of the location of the selected device-specific wear algorithm in the given storage device (step 400). The device-specific wear algorithm can be located in a dedicated DSWA storage area, or may be stored in the main storage area of the storage device, among other possible alternatives. Next, a determination is made as the location into which the selected device-specific wear algorithm is to be loaded (step 410). This can be achieved, for example, by loading the device-specific wear algorithm into a wear algorithm space of the device driver (depicted in FIG. 1 as wear algorithm space 135, subsequently having loaded wear algorithm 140 stored therein). The loading of the selected device-specific wear algorithm into the wear algorithm space of the device driver is then performed (step 420). The loading of the device-specific wear algorithm into the wear algorithm space continues until the device-specific wear algorithm has been loaded (step 430).

Figure 5:
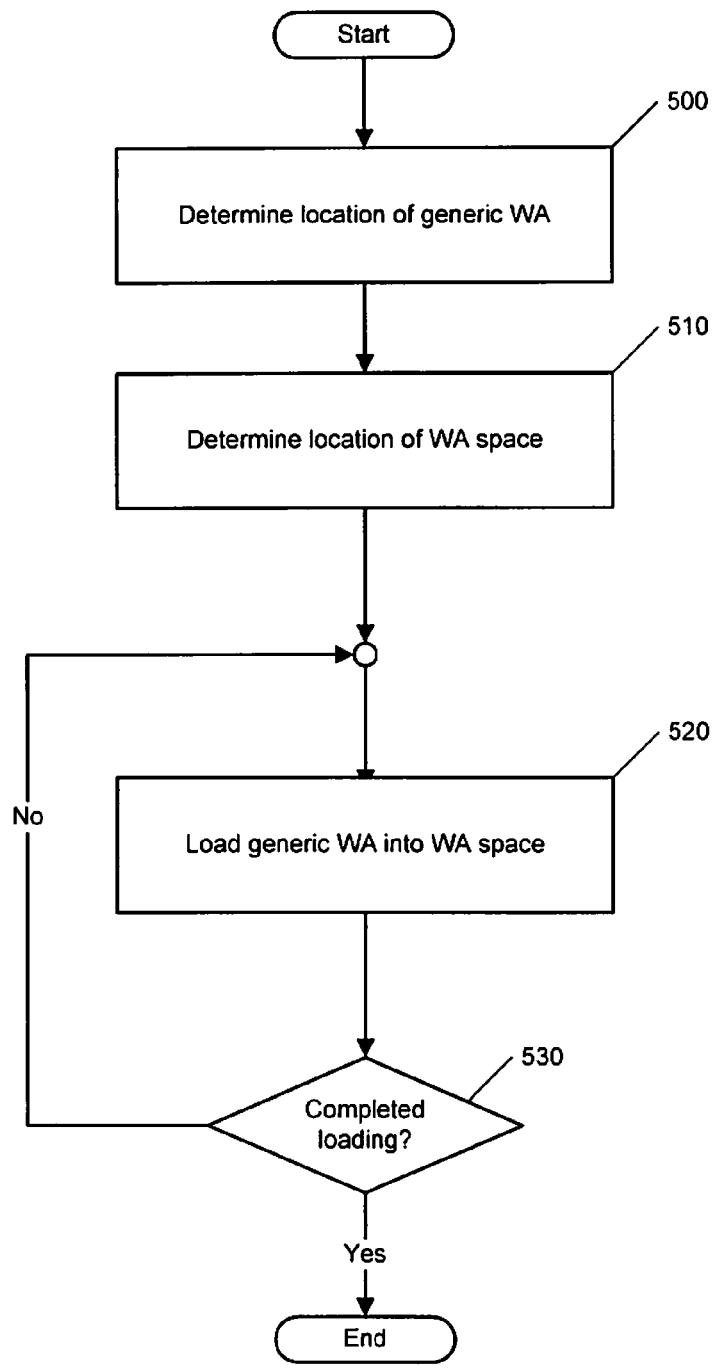
FIG. 5 is a flow diagram illustrating an example of a process for loading a generic wear algorithm according to embodiments of the present invention.

FIG. 5 is a flow diagram illustrating an example of a process for loading a generic wear algorithm according to embodiments of the present invention. The process begins, for example, with a determination of the location of the selected generic wear algorithm in the given storage device (step 500). As in the process of FIG. 4, the generic wear algorithm can be located in a dedicated wear algorithm storage area, or may be stored in the main storage area of the storage device, among other possible alternatives. Next, a determination is made as the location into which the selected generic wear algorithm is to be loaded (step 510). This can be achieved, for example, by loading the generic wear algorithm into a wear algorithm space of the device driver. The loading of the selected generic wear algorithm into the wear algorithm space of the device driver is then performed (step 520). The loading of the generic specific wear algorithm into the wear algorithm space continues until the generic wear algorithm has been loaded (step 530).

Figure 6:
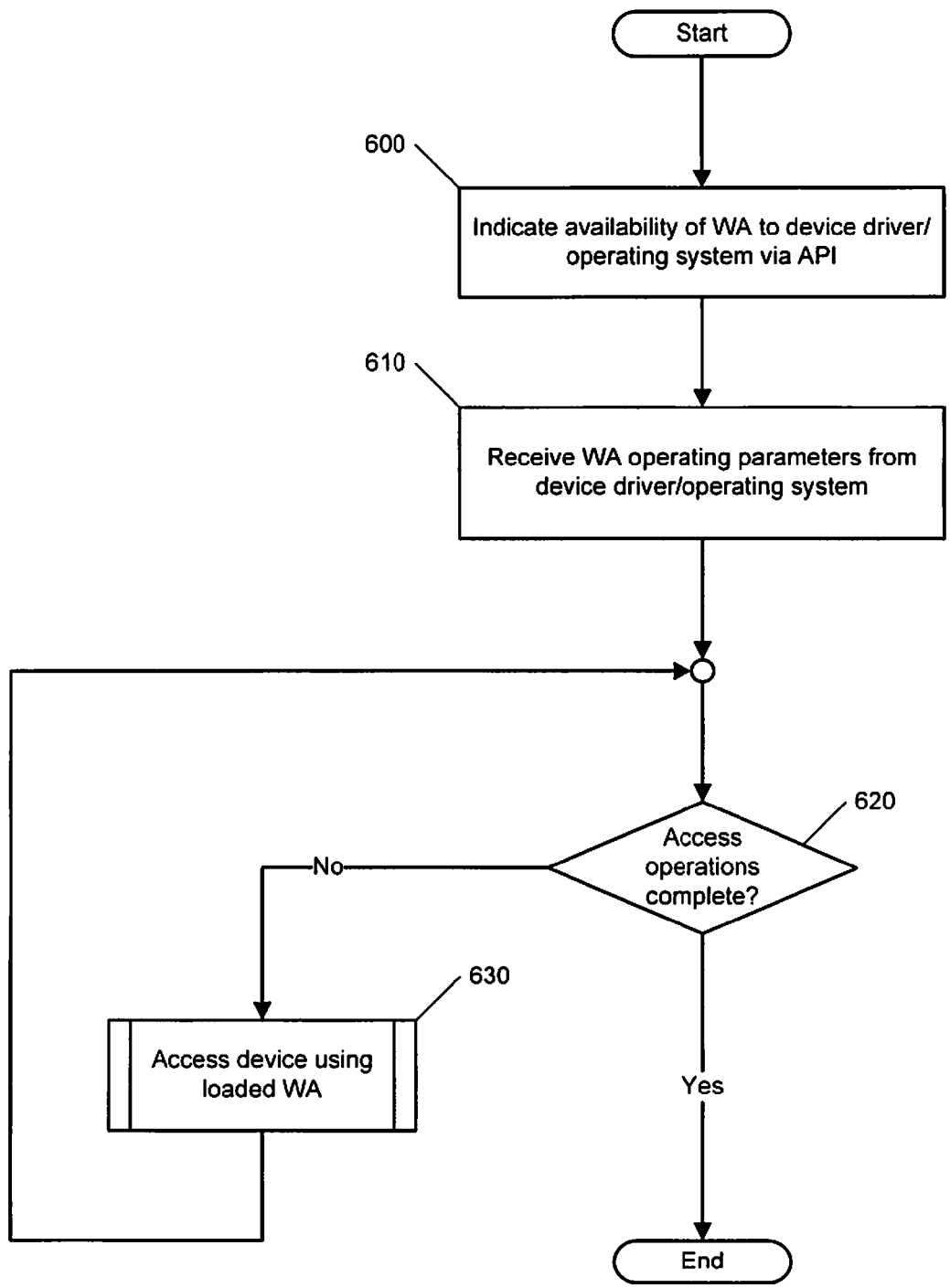
FIG. 6 is a flow diagram illustrating an example of a process for using a loaded wear algorithm according to embodiments of the present invention.

FIG. 6 is a flow diagram illustrating an example of a process for using a loaded wear algorithm according to embodiments of the present invention. The process for using a loaded wear algorithm begins with an indication of the wear algorithm's availability to the device driver and/or operating system via the wear algorithm application programming interface (WA API) (step 600). Next, wear algorithm operating parameters are received from the device and/or operating system (step 610). While the storage device is available for access (step 620), the storage device is accessed using the loaded wear algorithm (step 630).

Figure 7:
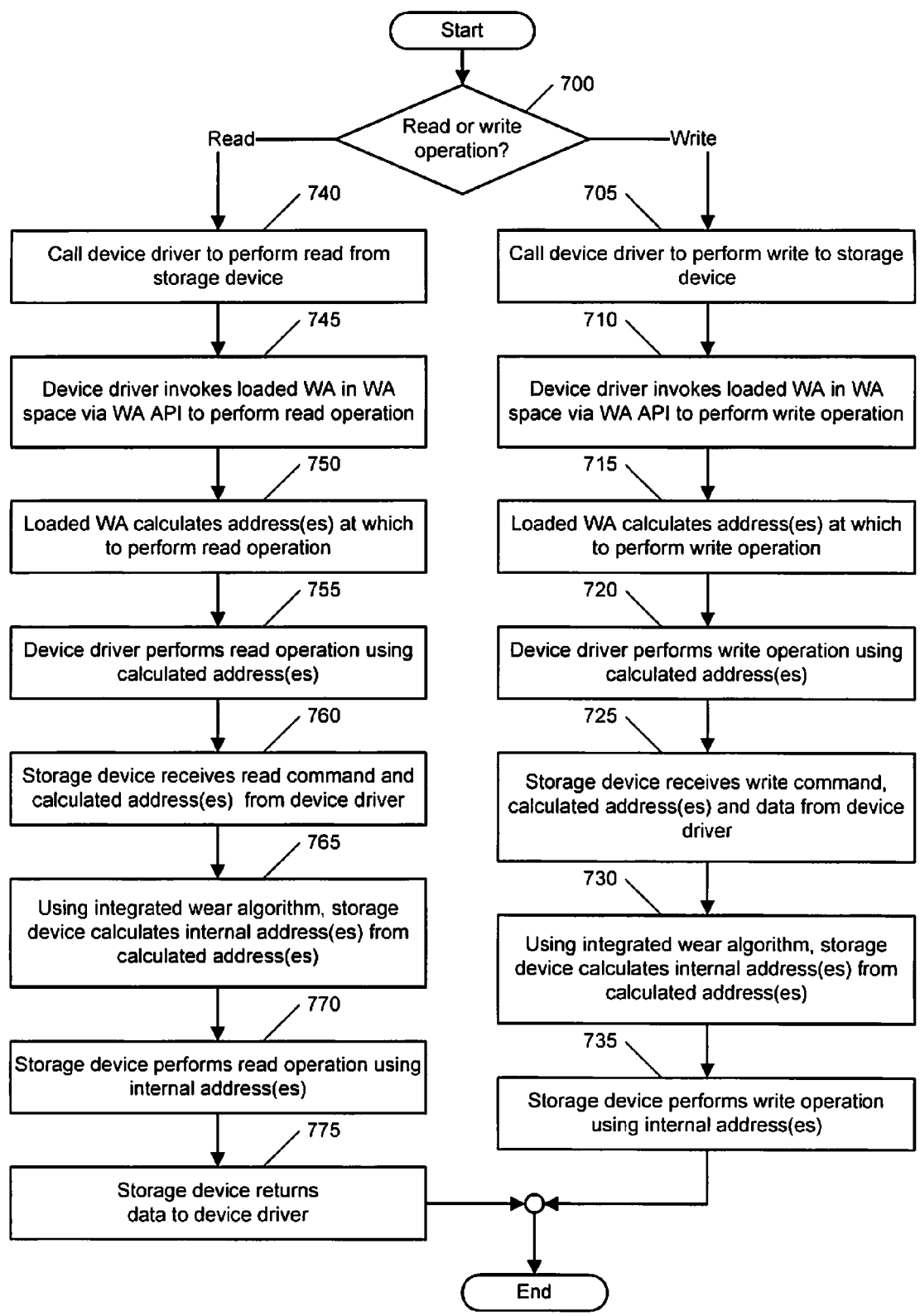
FIG. 7 is a flow diagram illustrating an example of a process of accessing a storage device using a loaded wear algorithm according to embodiments of the present invention.

FIG. 7 is a flow diagram illustrating the process of performing a read operation or write operation according to embodiments of the present invention. The process of performing read and write operations begins with a determination as to whether the operation to be performed is a read operation or a write operation (step 700). If the operation to be performed is a write operation, a call is made to the device driver to perform a write operation to the storage device (step 705). Next, the device driver invokes the loaded wear algorithm that is stored in the wear algorithm space, in order to perform the write operation (step 710).

The device driver invokes the loaded wear algorithm via the wear algorithm API, which allows the device driver to access the storage device in a manner consistent with the wear polices implemented in the loaded wear algorithm. As will be appreciated in light of the present disclosure, accessing the storage device can be performed in the normal course, in the case in which only one of a device-specific or generic wear algorithm is loaded into the device driver. It will be further appreciated that the use of a generic wear algorithm and a device-specific wear algorithm can also be combined. Either of the wear algorithms can be accessed before the other, as appropriate. For example, in the case in which several given applications access the storage device, a generic wear algorithm can be employed, with a device-specific wear algorithm (specific to the application and storage device) accessed prior to accessing the generic wear algorithm. In such a scenario, the generic wear algorithm provides a generally better wear pattern than the storage device's integrated wear algorithm, while the device-specific wear algorithm fine-tunes the wear pattern for the given application and storage device. Moreover, it will be noted that a device driver can change the write sector number and store this information locally, as shown in FIG. 7. It will be appreciated that, in light of the present disclosure, such an operation performs a read translation. Alternatively, the operating system/device driver can be instructed to convert the sector number to the selected sector number. Using the latter approach, a read mapping is unnecessary.

Once invoked, the loaded wear algorithm calculates the address(es) at which to perform the write operation (step 715). Using the address(es) thus calculated, the device driver performs the requested write operation to the storage device (step 720). The storage device then receives the write command, calculated address(es), and data from the device driver (step 725). Using its integrated wear algorithm, the storage device calculates the internal address(es) from the calculated address(es) (step 730). The storage device then performs the requested write operation, by storing the data sent by the device driver at the internal address(es) calculated from the calculated address(es) received from the device driver (step 735). The write operation is then complete.

In the case in which the requested operation is a read operation (step 700), the device driver is called to perform a read operation from the storage device (step 740). As will be appreciated, in light of the present disclosure, the address translations that occur in performing a read operation are similar to those that occur in performing a write operation according to embodiments of the present invention. Once the device driver is called to perform a read operation, the device driver invokes the loaded wear algorithm to perform certain of the address translation operations necessary to performing the read operation (step 745). As before, the device driver invokes the loaded wear algorithm (stored in the wear algorithm space of the device driver) via a wear algorithm API, which allows the device driver access to the functionality provided by the loaded wear algorithm. The loaded wear algorithm then calculates address(es) at which the read operation is to be performed in the storage device (step 750). The device driver then performs the read operation using these calculated address(es) (step 755). The storage device receives the read command and calculated address(es) from the device driver (step 760). Using its integrated wear algorithm, the storage device calculates internal address(es) from the calculated address(es) received from the device driver (step 765). The storage device then performs the requested read operation using the internal address(es) calculated from the calculated address(es) received from the device driver (step 770). The storage device then returns the data retrieved by the read operation to the device driver (step 775). The read operation is then complete.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the scope of this invention. Moreover, while the invention has been particularly shown and described with reference to these specific embodiments, it will be understood by those skilled in the art that the foregoing and other changes in the form and details may be made therein without departing from the scope of the invention.

What is claimed is:

1. A method implemented on a computing host processing system, the method comprising:
    uploading device-specific wear algorithm code to the host processing system from a storage device coupled to the host processing system; and
    configuring the device-specific wear algorithm code for execution on the host processing system, wherein
        said host processing system comprises an operating system that is executed on said host processing system,
        said operating system is configured to access said storage device via a device driver for said storage device,
        said storage device also comprises an integrated wear algorithm provided by a manufacturer of the storage device and configured for execution on the storage device,
        said integrated wear algorithm is not uploaded to the host processing system,
        said device-specific wear algorithm code is specific to a type of said storage device,
        said device-specific wear algorithm code is configured to be used to access said storage device, and
        said device-specific wear algorithm code is at least a portion of a wear algorithm.

2. The method of claim 1, further comprising:
    configuring generic wear algorithm code stored on the host processing system for execution on the host processing system.

3. The method of claim 2, wherein the generic wear algorithm code comprises a complete wear algorithm.

4. The method of claim 1, further comprising:
    accessing said storage device using said device-specific wear algorithm code.

5. The method of claim a 2, further comprising:
    accessing said storage device using said device-specific wear algorithm code and said generic wear algorithm code.

6. The method of claim 2, further comprising:
    accessing said storage device using said device-specific wear algorithm code executed on the host processing system, said generic wear algorithm code executed on the host processing system, and said integrated wear algorithm executed on the storage device.

7. The method of claim 1, further comprising:
    accessing said storage device using said integrated wear algorithm executed on the storage device.

8. The method of claim 2, further comprising:
    downloading said device-specific wear algorithm code back to said storage device; and
    downloading said generic wear algorithm code to said storage device.

9. A host processing system comprising:
    a processor;
    a storage interface, configured to be coupled to a storage device and coupled to said processor, wherein
        said storage device comprises an integrated wear algorithm provided by the manufacturer of the storage device and configured for execution on the storage device,
        said storage device comprises additional device-specific wear algorithm code,
        said device-specific wear algorithm code is specific to a type of said storage device,
        said device-specific wear algorithm code is configured to be uploaded from said storage device, and
        said device-specific wear algorithm is further configured to be used to access said storage device; and
    a memory, coupled to said processor, wherein
        said memory stores an operating system,
        said operating system is configured to be executed by said processor,
        said operating system is configured to access said storage device via a device driver for said storage device,
        said processor is configured to upload said device-specific wear algorithm code, but not said integrated wear algorithm, from said storage device to said memory, and
        wherein said processor is configured to configure said device-specific wear algorithm code for execution on the host processing system.

10. The computer host processing system of claim 9, wherein
    said memory comprises a wear algorithm space, and
    said processor is configured to configure said device-specific wear algorithm code for execution by storing the device-specific wear algorithm code in the wear algorithm space as a loaded wear algorithm, and
    further comprising:
    a wear algorithm application programming interface, wherein
        said wear algorithm application programming interface is configured to provide said operating system with access to said storage device via said loaded wear algorithm.

11. The computer host processing system of claim 9, further comprising:
    computer readable storage medium coupled to said processor; and
    computer code, encoded in said computer readable storage medium, configured to cause said processor to:
        upload said device-specific wear algorithm code, but not said integrated wear algorithm, from said storage device to said memory, and
        configure said device-specific wear algorithm code for execution on the host processing system,
    wherein
        said device-specific wear algorithm code is at least a portion of a wear algorithm.

12. An apparatus comprising:
means for uploading device-specific wear algorithm code, but not an integrated wear algorithm, from a storage device to a host processing system, wherein the storage device is configured to be coupled to the host processing system; and
means for configuring the device-specific wear algorithm code for execution on the host processing system, wherein
said host processing system comprises an operating system configured to be executed on said host processing system,
said operating system is configured to access said storage device via said device driver for said storage device,
said device-specific wear algorithm code is specific to a type of said storage device,
said device-specific wear algorithm code is configured to be used to access said storage device,
said device-specific wear algorithm code is at least a portion of a wear algorithm, and
said integrated wear algorithm is provided by the manufacturer of the storage device and configured for execution on the storage device.

13. The apparatus of claim 12, further comprising:
means for configuring generic wear algorithm code stored on the host processing system for execution on the host processing system.

14. The apparatus of claim 13, wherein said generic wear algorithm code comprises a complete wear algorithm.

15. The apparatus of claim 13, further comprising:
means for accessing said storage device using said device-specific wear algorithm code, said generic wear algorithm code, and said integrated wear algorithm.

16. The apparatus of claim 12, further comprising:
means for accessing said storage device using said device-specific wear algorithm code and said integrated wear algorithm.

17. An apparatus comprising:
a storage device, wherein
said storage device comprises
device-specific wear algorithm code, and
an integrated wear algorithm provided by the manufacturer of the storage device and configured for execution on the storage device,
said storage device is configured to be coupled to a host processing system,
said host processing system comprises an operating system,
said device-specific wear algorithm code is specific to a type of said storage device, and
said device-specific wear algorithm code is configured to be uploaded to and executed on the host processing system to access said storage device,
an operating system is configured to be executed on said host processing system,
said operating system is configured to access said storage device via a device driver for said storage device, and
said device-specific wear algorithm is at least a portion of a wear algorithm.

18. The method of claim 1, wherein said device-specific algorithm code is specific to an application using said storage device.

19. The method of claim 1, wherein said configuring the device-specific wear algorithm code for execution on the host processing system comprises loading the device-specific wear algorithm code into a wear algorithm space of a device driver for said storage device.

20. The method of claim 2, wherein said configuring generic wear algorithm code for execution on the host processing system comprises loading the generic wear algorithm code into a wear algorithm space of a device driver for said storage device.

21. The method of claim 2, wherein said device-specific wear algorithm code comprises one or more parameters for use by the generic wear algorithm code.

22. The method of claim 1, further comprising:
determining whether the device-specific wear algorithm code is stored in the storage device, and
wherein said uploading the device-specific wear algorithm code is performed in response to a determination that said device-specific wear algorithm code is stored in said storage device.

23. The method of claim 2, further comprising:
determining whether the generic wear algorithm code is available on the host processing device, and
wherein said configuring the generic wear algorithm code is performed in response to a determination that the generic wear algorithm code is available.

24. The method of claim 1, wherein said device specific wear algorithm code comprises a complete wear algorithm.

25. The host processing system of claim 9, wherein said processor is configured to configure said device-specific wear algorithm code for execution on the host processing system by loading said device-specific wear algorithm code into a wear algorithm space of said device driver.

26. The host processing system of claim 11, wherein said computer code is configured to cause said processor to configure said device-specific wear algorithm code for execution on the host processing system by loading said device-specific wear algorithm code into a wear algorithm space of said device driver.

27. The apparatus of claim 23, further comprising:
means for determining whether the device-specific wear algorithm code is stored in said storage device, and wherein said means for uploading device-specific wear algorithm code comprises means for uploading the device-specific wear algorithm code in response to a determination that said device-specific wear algorithm code is stored in said storage device.

28. The apparatus of claim 13, further comprising:
means for determining whether to configure the generic wear algorithm code for execution on the host processing system, and wherein said means for configuring generic wear algorithm code for execution comprises means for configuring the generic wear algorithm code for execution in response to a determination that said generic wear algorithm code should be configured for execution.

* * * * *

UNITED STATES PATENT AND TRADEMARK OFFICE
CERTIFICATE OF CORRECTION

| | | |
|---|---|---|
| PATENT NO. | : 8,626,984 B2 | Page 1 of 1 |
| APPLICATION NO. | : 12/257546 | |
| DATED | : January 7, 2014 | |
| INVENTOR(S) | : Gordon F. Pack | |

It is certified that error appears in the above-identified patent and that said Letters Patent is hereby corrected as shown below:

In the claims

Column 13
Line 28, in Claim 1, delete: "computing"
Line 60, in Claim 5, replace: "claim a 2" with -- claim 2 --

Column 14
Line 40, in Claim 10, delete: "computer"
Line 54, in Claim 11, delete: "computer"

Column 15
Line 14, in Claim 12, replace: "said device driver" with -- a device driver --

Column 16
Line 2, in Claim 18, insert: -- wear -- immediately before "algorithm"
Line 27, in Claim 23, replace: "device" with -- system --
Line 31, in Claim 24, replace: "device specific" with -- device-specific --
Line 45, in Claim 27, replace: "claim 23" with -- claim 12 --

Signed and Sealed this
Thirty-first Day of May, 2016

Michelle K. Lee
*Director of the United States Patent and Trademark Office*